United States Patent
Chen et al.

(10) Patent No.: US 11,341,284 B2
(45) Date of Patent: May 24, 2022

(54) TRUSTED HARDWARE-BASED DATA MANAGEMENT METHODS, APPARATUSES, AND DEVICES

(71) Applicant: ALIPAY (HANGZHOU) INFORMATION TECHNOLOGY CO., LTD., Zhejiang (CN)

(72) Inventors: Yuan Chen, Hangzhou (CN); Shubo Li, Hangzhou (CN); Wenyu Yang, Hangzhou (CN); Renhui Yang, Hangzhou (CN); Qin Liu, Hangzhou (CN); Qin Xiong, Hangzhou (CN); Sheng Zhang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/359,219

(22) Filed: Jun. 25, 2021

(65) Prior Publication Data
US 2022/0075902 A1    Mar. 10, 2022

(30) Foreign Application Priority Data
Sep. 4, 2020    (CN) .......................... 202010921428.5

(51) Int. Cl.
*G06F 21/78*    (2013.01)
*G06F 21/60*    (2013.01)
*H04L 9/32*    (2006.01)

(52) U.S. Cl.
CPC ............ *G06F 21/78* (2013.01); *G06F 21/602* (2013.01); *H04L 9/3247* (2013.01)

(58) Field of Classification Search
CPC ..... G06F 21/78; G06F 21/602; H04L 9/3247; H04L 2209/38; H04L 9/0618; H04W 12/108; H04W 12/12
See application file for complete search history.

(56) References Cited

U.S. PATENT DOCUMENTS 10,505,741 B1    12/2019 Conley
10,938,562 B2 *   3/2021 Liu ...................... H04L 9/0637
(Continued)

FOREIGN PATENT DOCUMENTS

CN         1996955       7/2007
CN       103677935       3/2014
(Continued)

OTHER PUBLICATIONS

Zhao et al., "A Blockchain based Identity Management System Considering Reputation," 2019 2nd International Conference on Information Systems and Computer Aided Education (ICISCAE) Year: 2019 | Conference Paper | Publisher: IEEE.*
(Continued)

*Primary Examiner* — Roderick Tolentino
(74) *Attorney, Agent, or Firm* — Fish & Richardson P.C.

(57) ABSTRACT

Embodiments of the present specification disclose trusted hardware-based data management methods, apparatuses, and devices. One method comprising: identifying, by trusted hardware, data description information to be published, wherein the data description information describes target data of a data owner provided by a trusted institution, and the trusted hardware is associated with a decentralized identifier of the data owner; requesting the trusted institution to verify whether the trusted institution stores user service data for generating the target data; receiving a verification result from the trusted institution; and publishing the data description information in response to determining that the verification result indicating that the trusted institution stores the user service data for generating the target data.

20 Claims, 5 Drawing Sheets

(56) References Cited

U.S. PATENT DOCUMENTS

| | | | | |
|---|---|---|---|---|
| 11,038,670 | B2* | 6/2021 | Li | H04L 9/0643 |
| 11,102,009 | B2* | 8/2021 | Zolfonoon | H04L 67/02 |
| 2018/0254898 | A1 | 9/2018 | Sprague et al. | |
| 2018/0374173 | A1* | 12/2018 | Chen | G06Q 50/184 |
| 2019/0197130 | A1* | 6/2019 | Huang | H04L 9/3239 |
| 2019/0333054 | A1* | 10/2019 | Cona | G06F 21/31 |
| 2020/0084202 | A1* | 3/2020 | Smith | H04L 67/28 |
| 2021/0091934 | A1* | 3/2021 | Fletcher | H04W 12/06 |
| 2021/0209603 | A1* | 7/2021 | Panicker | G06Q 20/4016 |
| 2021/0243167 | A1* | 8/2021 | Todd | H04L 63/04 |

FOREIGN PATENT DOCUMENTS

| | | |
|---|---|---|
| CN | 104010044 | 8/2014 |
| CN | 105631322 | 6/2016 |
| CN | 106408486 | 2/2017 |
| CN | 107507091 | 12/2017 |
| CN | 107579979 | 1/2018 |
| CN | 107622385 | 1/2018 |
| CN | 107729745 | 2/2018 |
| CN | 107742189 | 2/2018 |
| CN | 107968709 | 4/2018 |
| CN | 108076011 | 5/2018 |
| CN | 108471350 | 8/2018 |
| CN | 108616539 | 10/2018 |
| CN | 108632284 | 10/2018 |
| CN | 108881160 | 11/2018 |
| CN | 108932297 | 12/2018 |
| CN | 108985089 | 12/2018 |
| CN | 109150607 | 1/2019 |
| CN | 109245893 | 1/2019 |
| CN | 109376504 | 2/2019 |
| CN | 109522722 | 3/2019 |
| CN | 109525400 | 3/2019 |
| CN | 109547500 | 3/2019 |
| CN | 109660358 | 4/2019 |
| CN | 109710270 | 5/2019 |
| CN | 109741039 | 5/2019 |
| CN | 109768865 | 5/2019 |
| CN | 109840436 | 6/2019 |
| CN | 109993490 | 7/2019 |
| CN | 110009232 | 7/2019 |
| CN | 110034924 | 7/2019 |
| CN | 110046165 | 7/2019 |
| CN | 110083610 | 8/2019 |
| CN | 110086804 | 8/2019 |
| CN | 110222533 | 9/2019 |
| CN | 110224837 | 9/2019 |
| CN | 110335149 | 10/2019 |
| CN | 110457875 | 11/2019 |
| CN | 110516178 | 11/2019 |
| CN | 110555292 | 12/2019 |
| CN | 110636062 | 12/2019 |
| CN | 110837658 | 2/2020 |
| CN | 110968743 | 4/2020 |
| CN | 110990804 | 4/2020 |
| CN | 111049660 | 4/2020 |
| CN | 111179067 | 5/2020 |
| CN | 111191268 | 5/2020 |
| CN | 111222157 | 6/2020 |
| CN | 111340627 | 6/2020 |
| CN | 111414599 | 7/2020 |
| CN | 111415157 | 7/2020 |
| CN | 111506662 | 8/2020 |
| CN | 111527489 | 8/2020 |
| CN | 111597565 | 8/2020 |
| CN | 111741036 | 10/2020 |
| WO | WO 2019179535 | 5/2020 |

OTHER PUBLICATIONS

Szalachowski, Pawel, "Password-Authenticated Decentralized Identities," IEEE Transactions on Information Forensics and Security Year: 2021 | vol. 16 | Journal Article | Publisher: IEEE.*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
U.S. Appl. No. 17/364,658, filed Jun. 30, 2021, Wenyu Yang.
U.S. Appl. No. 17/362,914, filed Jun. 29, 2021, Qin Liu.
U.S. Appl. No. 17/359,475, filed Jun. 25, 2021, Renhui Yang.
U.S. Appl. No. 17/358,249, filed Jun. 25, 2021, Shubo Li.
U.S. Appl. No. 17/359,487, filed Jun. 25, 2021, Renhui Yang.
U.S. Appl. No. 17/348,975, filed Jun. 16, 2021, Renhui Yang.
U.S. Appl. No. 17/364,602, filed Jun. 30, 2021, Renhui Yang.
U.S. Appl. No. 17/349,764, filed Jun. 16, 2021, Qin Liu.
U.S. Appl. No. 17/359,069, filed Jun. 25, 2021, Yuan Chen.
U.S. Appl. No. 17/359,476, filed Jun. 25, 2021, Wenyu Yang.
Aydar et al., "Towards a Blockchain Based Digital Identity Verification, Record Attestation and Record Sharing System," Cornell University Library, arXiv:1906.09791v1, Jun. 24, 2019, 25 pages.
Extended European Search Report in European Application No. 21182488.3, dated Dec. 15, 2021, 12 pages.
Wikipedia.org [online], "Trusted Execution Environment," Sep. 2, 2020, retrieved on Dec. 7, 2021, retrieved from URL<https://en.wikipedia.org/w/index.php?title=Trusted_execution_environment£0ldid=976292142>, 7 pages.

* cited by examiner

TRUSTED HARDWARE-BASED DATA MANAGEMENT METHODS, APPARATUSES, AND DEVICES

CROSS-REFERENCE TO RELATED APPLICATIONS

This application claims priority to Chinese Patent Application No. 202010921428.5, filed on Sep. 4, 2020, which is hereby incorporated by reference in its entirety.

TECHNICAL FIELD

The present application relates to the field of Internet technologies, and in particular, to trusted hardware-based data management methods, apparatuses, and devices.

BACKGROUND

With the development and progress of science and technology, we entered the digital era. Information has been popularized and disseminated at a high speed by using technologies such as computer storage, processing, and dissemination. The digital technology has also become the core and universal technology of various media in the current era. As a result, data resources owned or controlled by an individual and an enterprise have gradually begun to bring more benefits to the individual and the enterprise. Therefore, a data asset is also considered as one of the most important asset forms in the digital era.

Based on the previous description, how to provide a more convenient and reliable user data management method becomes an urgent problem to be resolved.

SUMMARY

Embodiments of the present specification provide trusted hardware-based data management methods, apparatuses, and devices, to improve convenience and reliability of managing personal data by a user.

To resolve the previously described technical problem, the embodiments of the present specification are implemented as follows:

Embodiments of the present specification provide a trusted hardware-based data management method, including the following: trusted hardware obtains data description information to be published, where the data description information is used to describe target data of a data owner that can be provided by a trusted institution, and the trusted hardware has a binding relationship with a decentralized identifier of the data owner; requests the trusted institution to verify whether the trusted institution stores user service data needed for generating the target data; receives a verification result fed back by the trusted institution; and publishes the data description information if the verification result indicates that the trusted institution stores the user service data needed for generating the target data.

Embodiments of the present specification provide a data acquisition method, including the following: data description information published by a data owner is obtained, where the data description information is used to describe target data of the data owner that can be provided by a trusted institution; an acquisition request for the target data is generated based on the data description information; the acquisition request is sent to trusted hardware of the data owner, where the trusted hardware has a binding relationship with a decentralized identifier of the data owner; and the target data is received.

Embodiments of the present specification provide a trusted hardware-based data management apparatus, including: a first acquisition module, configured to obtain, by a trusted hardware, data description information to be published, where the data description information is used to describe target data of a data owner that can be provided by a trusted institution, and the trusted hardware has a binding relationship with a decentralized identifier of the data owner; a verification request module, configured to request the trusted institution to verify whether the trusted institution stores user service data needed for generating the target data; a first receiving module, configured to receive a verification result fed back by the trusted institution; and a publishing module, configured to publish the data description information if the verification result indicates that the trusted institution stores the user service data needed for generating the target data.

Embodiments of the present specification provide a data acquisition apparatus, including: a first acquisition module, configured to obtain data description information published by a data owner, where the data description information is used to describe target data of the data owner that can be provided by a trusted institution; an acquisition request generation module, configured to generate an acquisition request for the target data based on the data description information; a sending module, configured to send the acquisition request to trusted hardware of the data owner, where the trusted hardware has a binding relationship with a decentralized identifier of the data owner; and a receiving module, configured to receive the target data.

Embodiments of the present specification provide a trusted hardware-based data management device, including: at least one processor; and a memory communicably coupled to the at least one processor, where the memory stores instructions that can be executed by the at least one processor, and the instructions are executed by the at least one processor to enable the at least one processor to: obtain data description information to be published, where the data description information is used to describe target data of a data owner that can be provided by a trusted institution, and the trusted hardware has a binding relationship with a decentralized identifier of the data owner; request the trusted institution to verify whether the trusted institution stores user service data needed for generating the target data; receive a verification result fed back by the trusted institution; and publish the data description information if the verification result indicates that the trusted institution stores the user service data needed for generating the target data.

Embodiments of the present specification provide a data acquisition device, including: at least one processor; and a memory communicably coupled to the at least one processor, where the memory stores instructions that can be executed by the at least one processor, and the instructions are executed by the at least one processor to enable the at least one processor to: obtain data description information published by a data owner, where the data description information is used to describe target data of the data owner that can be provided by a trusted institution; generate an acquisition request for the target data based on the data description information; send the acquisition request to trusted hardware of the data owner, where the trusted hardware has a binding relationship with a decentralized identifier of the data owner; and receive the target data.

The at least one embodiment provided in the present specification can achieve the following beneficial effects:

After obtaining the data description information used to describe the target data of the data owner that can be provided by the trusted institution, the trusted hardware that has the binding relationship with the decentralized identifier of the data owner can request the trusted institution to verify whether the trusted institution stores the user service data needed for generating the target data; and if yes, the trusted hardware can consider that the data description information is authentic and valid, so that the data description information can be published by using the trusted hardware. In the solutions, the data owner can conveniently manage a personal data asset by using the trusted hardware, and further the data owner can be prevented from publishing false data description information, so that the data owner can perform reliable and effective management of the personal data asset.

BRIEF DESCRIPTION OF DRAWINGS

To describe technical solutions in the embodiments of the present specification or in the existing technology more clearly, the following briefly describes the accompanying drawings needed for describing the embodiments or the existing technology. Clearly, the accompanying drawings in the following description show merely some embodiments of the present specification, and a person of ordinary skill in the art can still derive other drawings from these accompanying drawings without creative efforts.

DESCRIPTION OF EMBODIMENTS

To make the objectives, technical solutions, and advantages of the one or more embodiments of the present specification clearer, the following clearly and comprehensively describes the technical solutions of the one or more embodiments of the present specification with reference to specific embodiments of the present specification and corresponding accompanying drawings. Clearly, the described embodiments are merely some but not all of the embodiments of the present specification. All other embodiments obtained by a person of ordinary skill in the art based on the embodiments of the present specification without creative efforts shall fall within the protection scope of the one or more embodiments of the present specification.

The technical solutions provided in the embodiments of the present specification are described in detail below with reference to the accompanying drawings.

In the existing technology, a data asset can be a data resource owned or controlled by an individual or an enterprise, able to bring future economic benefits to the individual or the enterprise, and recorded physically or electronically. For example, the data asset is data carried by a file such as a photo, a document, a drawing, a video, a digital copyright, etc. of the individual or the enterprise. The data asset is a type of asset that exists in a data form relative to a physical asset. The data asset is considered as one of the most important asset forms in the digital era. However, currently, there is no method for managing a data asset of an individual or an enterprise safely, conveniently, and effectively.

Figure 1:
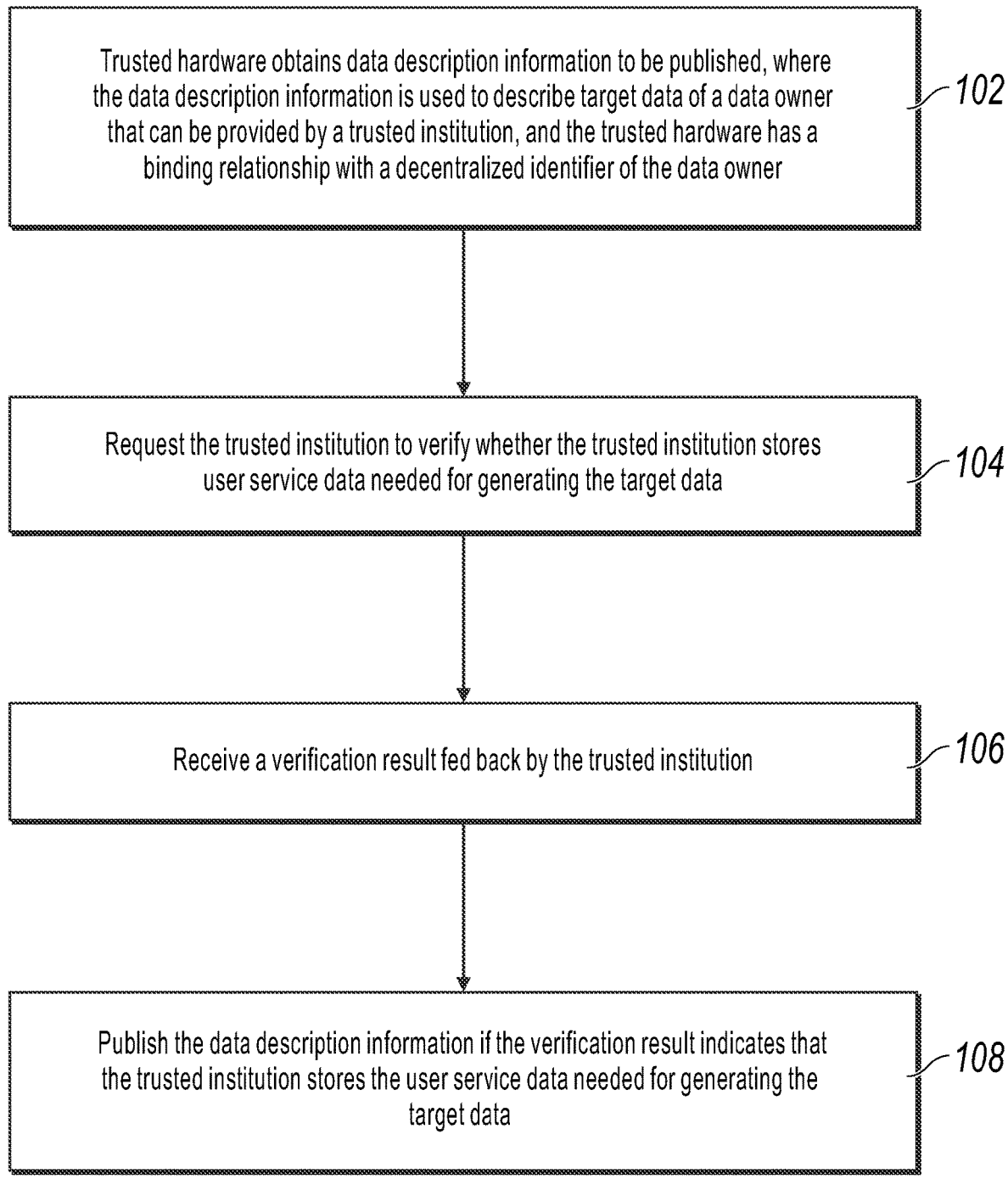
FIG. 1 is a schematic flowchart illustrating a trusted hardware-based data management method, according to embodiments of the present specification.

To deal with the defects in the existing technology, the following embodiments are provided in the present solutions:

FIG. 1 is a schematic flowchart illustrating a trusted hardware-based data management method, according to embodiments of the present specification. From a program perspective, the process can be performed by trusted hardware, or can be performed by an application client or an application server communicably coupled to the trusted hardware and configured to manage a user data asset. As shown in FIG. 1, the process can include the following steps.

Step 102: The trusted hardware obtains data description information to be published, where the data description information is used to describe target data of a data owner that can be provided by a trusted institution, and the trusted hardware has a binding relationship with a decentralized identifier of the data owner.

In the embodiments of the present specification, the trusted hardware is one of important foundation of trusted computing, and trusted hardware-based means that a trusted execution environment (TEE) can be constructed in a hardware device to protect program code and data in the trusted hardware from being disclosed and modified, thereby protecting privacy and security of the data in the trusted hardware. In actual applications, there are multiple types of trusted hardware, such as Intel SGX, ARM TrustZone, and other trusted chips. In the embodiments of the present specification, a specific model of the trusted hardware is not specifically limited. The trusted hardware can alternatively include a terminal device or server carrying a trusted chip.

In the embodiments of the present specification, a blockchain can be understood as a data chain formed by sequentially stored multiple blocks, and a block header of each block includes a timestamp of the block, a hash value of information about a previous block, and a hash value of information about the block, thereby implementing mutual verification between blocks and forming a blockchain that cannot be tampered with. Each block can be understood as one data block (data storage unit). As a decentralized database, the blockchain is a chain of data blocks generated through mutual association by using a cryptography method. Each data block includes information about one network transaction, and is used to verify validity (anti-counterfeiting) of information about the data block and generate the next block. A chain formed by connecting blocks end to end is the blockchain. If data in a block needs to be modified, content of all blocks after the block needs to be modified, and data backed up by all nodes in the blockchain network needs to be modified. Therefore, the blockchain is characterized by being difficult to tamper with and delete. After data is stored in the blockchain, the blockchain is reliable as a method for maintaining content integrity.

In the embodiments of the present specification, a decentralized digital identity service can be provided by using a blockchain platform. Specifically, the data owner can use an application configured to manage a user data asset to request a decentralized identity server (DIS) to create a personal decentralized identifier (DID) and decentralized identifier document (DID Doc). In actual applications, both the DID and the DID Doc of the data owner can be stored in the blockchain platform.

The DIS is a blockchain-based identity management solution. The DIS server can be connected to the blockchain platform, and provide functions such as digital identity creation, verification, and management, to implement normalized management and protection of physical data, ensure authenticity and efficiency of information transmission, and resolve challenges such as cross-agency identity authentication and data cooperation.

In the embodiments of the present specification, the data owner can further use the trusted hardware or an application communicably coupled to the trusted hardware and configured to manage a user data asset to request to establish the binding relationship between the trusted hardware and the DID of the data owner, so that the data owner can manage a personal data asset by using the trusted hardware.

Specifically, before the obtaining data description information to be published in step 102, the method can further include the following:

identity identifier information of the data owner is obtained;

hardware identifier information of the trusted hardware is obtained;

a decentralized identifier binding request is generated based on the identity identifier information and the hardware identifier information, where the decentralized identifier binding request is used to request to establish a mapping relationship between the decentralized identifier of the data owner and the trusted hardware; and the decentralized identifier binding request is sent to a decentralized identity server.

In response to the decentralized identifier binding request, the decentralized identity server stores information about a mapping relationship between the DID of the data owner and the hardware identifier information of the trusted hardware in the DID Doc of the data owner, to complete establishment of the binding relationship between the trusted hardware and the DID of the data owner.

In actual applications, the decentralized identity server can further generate a key pair for the trusted hardware bound to the DID of the data owner. A private key in the key pair can be stored in the trusted hardware, and a public key corresponding to the private key can be stored in the DID Doc of the data owner.

Therefore, the data owner can digitally sign an operation instruction or personal data by using the private key stored in the trusted hardware, and another user can perform signature verification on the operation instruction or the personal data of the data owner by using the public key in the DID Doc of the data owner, so that the another user can implement identity verification on the data owner, and the data owner can effectively manage the personal data asset and the personal identity by using the trusted hardware.

In the embodiments of the present specification, the identity identifier information of the data owner can include information that can be used to determine the identity of the data owner. The data owner can be an enterprise user or an individual user. Identity identifier information of the individual user can include ID card number information, contact information, etc. Identity identifier information of the enterprise user can include a business license number of the enterprise, a unified social credit code of the enterprise, a taxpayer identification number of the enterprise, etc. Implementations are not specifically limited.

In actual applications, a user can input identity identifier information to an application interface of an application configured to manage a user data asset, a user can collect a personal ID image by using an image collection device, a user can collect audio including identity identifier information by using an audio collection device, etc., so that the execution body of the method in FIG. 1 can obtain the identity identifier information of the user. Implementations are not specifically limited.

The hardware identifier information of the trusted hardware can be information used to identify the trusted hardware, and it usually needs to ensure that the hardware identifier information of the trusted hardware is unique and unchanged compared with other trusted hardware. In actual applications, the hardware identifier information of the trusted hardware can be unique identifier information generated for the trusted hardware by a provider of the trusted hardware, or can be unique identifier information generated for the trusted hardware by an application configured to manage a user data asset. Implementations are not specifically limited.

In actual applications, information stored in the trusted hardware cannot be tampered with, so that trustiness of data stored in the trusted hardware can be ensured. Therefore, the hardware identifier information of the trusted hardware can be stored in the trusted hardware. When the data owner needs to manage the personal data asset by using the trusted hardware, the execution body of the method in FIG. 1 can automatically request to obtain the hardware identifier information stored in the trusted hardware. This method is convenient and fast, and can ensure trustiness of the obtained hardware identifier information of the trusted hardware. Alternatively, the data owner can input the hardware identifier information of the trusted hardware to an application interface of an application configured to manage a user data asset. Implementations are not specifically limited.

Step 104: Request the trusted institution to verify whether the trusted institution stores user service data needed for generating the target data.

In the embodiments of the present specification, the data description information to be published by the data owner can be description information of a data asset that the data owner needs to manage by using the trusted hardware. Specifically, the data description information can be used to reflect a source, a type, a content overview, etc. of the target data owned by the data owner. Implementations are not specifically limited. For example, the data asset description information for the target data of the data owner can be represented as: a data source-XX bank; a type-total quarterly statement; and a content overview-data range-Aug. 1, 2019 to Jul. 31, 2020. The data asset description information can reflect that the data owner has a personal total quarterly salary statement from Aug. 1, 2019 to Jul. 31, 2020 obtained by processing personal salary statement data in an XX Bank.

In actual applications, to prevent the user from publishing false data description information, the trusted institution can be used to verify whether the trusted institution stores the user service data needed for generating the target data. If yes, it indicates that the data owner actually has the data asset indicated by the data description information. If no, it indicates that the data owner does not have the data asset indicated by the data description information.

There can be multiple types of trusted institutions, and usually not all types of data that can be provided by different trusted institutions are the same. For example, the trusted institution can include a bank, a tax bureau, an authority credit bureau, a service platform, etc. The bank can provide trusted salary statement data, the tax bureau can provide trusted tax payment records, the authority credit bureau can provide trusted credit reports, the service platform can provide trusted transaction statement data of merchants, etc. Implementations are not specifically limited.

In the embodiments of the present specification, the trusted hardware stores the private key of the data owner, and the public key corresponding to the private key is stored in the DID Doc of the data owner. Therefore, in step 104, the data owner can send a data description information verification request to the trusted institution by using the trusted hardware. The data description information can include the identity identifier information of the data owner, the DID of the data owner, and data description information digitally signed by using the private key in the trusted hardware.

Correspondingly, the trusted institution can determine the identity of the data owner based on the identity identifier information or the DID of the data owner, and perform signature verification on the digitally signed data description information by using the public key corresponding to the private key that is obtained from the DID Doc of the data owner. If the signature verification succeeds, it can indicate that the data description information verification request is actually sent by the data owner, so that the trusted institution can respond to the data description information verification request. If the signature verification fails, it can indicate that the data description information verification request is not sent by the data owner, so that the trusted institution can refuse to respond to the data description information verification request, to prevent a criminal from obtaining information about whether another person has a specified data asset, thereby improving security and privacy of the data asset of the data owner.

Step 106: Receive a verification result fed back by the trusted institution.

Step 108: Publish the data description information if the verification result indicates that the trusted institution stores the user service data needed for generating the target data.

In the embodiments of the present specification, if the verification result indicates that the trusted institution stores the user service data needed for generating the target data, it can be determined that the data owner can obtain the target data indicated by the data description information, i.e., the data owner has the data asset indicated by the data description information. Therefore, the data description information can be published.

In the embodiments of the present specification, the data description information can be published to a data transmission application, so that other registered users of the data transmission application can determine that the data owner has the data asset indicated by the data description information, so that the other registered users can perform a data asset transaction with the data owner. The data transmission application can provide services such as data asset publication, transfer, and transaction. The data transmission application and the application configured to manage a user data asset in the embodiments of the present specification can be the same application, or can be different applications. Implementations are not specifically limited.

It should be understood that, some steps of the method in the one or more embodiments of the present specification are interchangeable in terms of sequence based on actual needs, or some steps of the method can be omitted or deleted.

In the method in FIG. 1, after obtaining the data description information used to describe the target data of the data owner that can be provided by the trusted institution, the trusted hardware that has the binding relationship with the decentralized identifier of the data owner can request the trusted institution to verify whether the trusted institution stores the user service data needed for generating the target data; and if yes, the trusted hardware can consider that the data description information is authentic and valid, so that the data description information can be published by using the trusted hardware. In the solutions, the data owner can conveniently manage a personal data asset by using the trusted hardware, and further the data owner can be prevented from publishing false data description information, so that the data owner can perform reliable and effective management of the personal data asset.

Based on the method in FIG. 1, embodiments of the present specification further provide some specific implementations of the method. The specific implementations are described below.

In the embodiments of the present specification, the data description information to be published can be obtained by using multiple methods.

Method 1

The target data of the data owner can be generated by using a device other than the trusted hardware, and the data owner can publish the data description information for the target data by using the trusted hardware before storing the target data generated by the another device in the personal trusted hardware. In this case, that the trusted hardware obtains data description information to be published in step 102 can specifically include:

the trusted hardware identifies a selection operation performed by the data owner on a program identifier of a target trusted application displayed in a target application interface, where the selection operation is used to indicate to process the user service data of the data owner in the trusted institution by using the target trusted application to obtain the target data, and the target trusted application is deployed in a trusted application environment of a target server; and generates the data description information to be published for the target data based on the selection operation.

In this implementation, the target application interface can be an application interface of an application configured to manage a user data asset. The target application interface can display program identifiers of multiple trusted applications supported by the application configured to manage a user data asset, so that the data owner can select a trusted application that the data owner allows to generate the target data.

The trusted application (TAPP) can be an application running in a trusted execution environment (TEE). When the trusted application runs, data obtained from a trusted data source can be processed according to a specified calculation rule, to generate the target data. In actual applications, the trusted application can be deployed in a trusted application environment of a serving end of the application configured to manage a user data asset, or can be deployed in a trusted application environment of another server communicably coupled to the server end of the application configured to manage a user data asset. Implementations are not specifically limited.

In actual applications, a data source of input data of the trusted application can be predetermined as the trusted institution, and a data processing rule that needs to be executed by the trusted application can be predetermined, so that the trusted application can obtain user service data of a specified type of the data owner from the trusted institution, and execute the predetermined data processing rule to obtain the target data.

In the embodiments of the present specification, the data source of the trusted application, the data processing rule that needs to be executed by the trusted application, and a type of the generated target data are not specifically limited, and can be specified by the user based on actual needs. For example, the trusted application can generate the total quarterly salary statement of the user based on monthly salary statement data of the user in bank A, and the total quarterly salary statement can be the target data generated by the trusted application. Based on the previous description, after selecting the program identifier of the target trusted application, the data owner can automatically generate the data description information to be published for the target data based on setting information of the target trusted application.

In the embodiments of the present specification, information about a mapping relationship between the target trusted application and the target data can be stored in the decentralized identifier document DID Doc of the data owner, so that the trusted application configured to generate the target data of the data owner can be subsequently determined based on the information in the DID Doc of the data owner. Details are omitted here for simplicity.

In the embodiments of the present specification, after the data owner publishes the data description information for the target data to the data transmission application, a data user can request to obtain the target data from the data owner based on the information published by the data owner.

Therefore, after the publishing the data description information, the method can further include the following:

an acquisition request generated by the data user for the target data based on the data description information is obtained, where the acquisition request can be generated by the data user based on the data description information published by the data owner for the target data and obtained from the data transmission application;

a request for generating the target data is sent to the target server carrying the target trusted application in response to the acquisition request; and a processing result fed back by the target server is received.

In the embodiments of the present specification, after obtaining the acquisition request for the target data from the data user, the data owner can determine the target trusted application configured to generate the target data based on the information in the DID Doc of the data owner. If the data owner allows the data user to obtain the target data, the data owner can send, by using a trusted application, a request for generating the target data to the target server carrying the target trusted application, so that the target server can run the target trusted application to generate the target data.

The target server can further feedback the processing result to the data owner. If the processing result indicates that the target data has been generated, both the data owner and the data user can obtain the target data from the target server, so that the data owner can manage the personal data asset by using the trusted hardware.

In addition, the target trusted application runs in the trusted execution environment, so that the target data generated by the target trusted application cannot be tampered with, and the target trusted application is configured to process the user service data obtained from the trusted data source, so that trustiness of the target data generated by the target trusted application can be ensured. Furthermore, because the target data generated by the trusted application is obtained by processing the original user service data, the data user is enabled to obtain only the target data but no original user data involved in generating the target data, to improve security and privacy of the original service data of the data owner.

In the embodiments of the present specification, the data owner can further specify a usage authorization approval process for the target data, to allow the data user to obtain the target data after approval succeeds.

Specifically, before the sending a request for generating the target data to the target server carrying the target trusted application, the method can further include the following:

a usage authorization instruction of a usage authorization approver of the target data for the acquisition request is obtained;

usage authorization information is generated based on the usage authorization instruction;

the usage authorization information is digitally signed by using the private key of the data owner in the trusted hardware, to obtain digitally signed usage authorization information, where the public key corresponding to the private key is stored in the decentralized identifier document of the data owner; and the digitally signed usage authorization information is sent to the target server carrying the target trusted application.

The target server can obtain the public key corresponding to the private key stored in the trusted hardware from the DID Doc of the data owner, and perform signature verification on the digitally signed usage authorization information by using the public key. If the verification succeeds, it can be determined that the digitally signed usage authorization information is authorized by the data owner for generation. Therefore, the target trusted application can be run to generate the target data. If the approval performed by the usage authorization approver of the target data fails, or the signature verification performed by the target server on the digitally signed usage authorization information fails, the trusted application can be prohibited from generating the target data, so that the data user cannot obtain the target data, thereby ensuring security of the data asset of the data owner.

Method 2

The target data of the data owner needs to be generated by using the trusted hardware, and the data owner can publish the data description information for the target data after generating the target data by using the trusted hardware. In this case, that the trusted hardware obtains data description information to be published in step 102 can specifically include:

the trusted hardware obtains the user service data of the data owner from the trusted institution;

processes the user service data by using a target trusted application included in the trusted hardware, to obtain the target data; and the data description information to be published for the target data is generated based on the target data.

An implementation principle of the target trusted application in this implementation can be the same as the implementation principle of the target trusted application in the implementation 1. However, in this implementation, the target trusted application can be deployed in the trusted hardware.

Specifically, the target trusted application can be included in a trusted execution environment of the trusted hardware, and the trusted execution environment is isolated from an operating system of the trusted hardware.

Correspondingly, that the trusted hardware obtains the user service data of the data owner from the trusted institution can specifically include: the trusted hardware obtains the user service data of the data owner from the trusted institution by using an interface predefined in code in the trusted execution environment.

In the embodiments of the present specification, the trusted execution environment (TEE) is a secure extension based on CPU hardware and is isolated from the outside. Currently, the industry attaches great importance to TEE solutions. Almost all mainstream chip and software alliances have respective TEE solutions, such as a trusted platform module (TPM) in a software aspect, and Intel software guard extensions (SGX), an ARM Trustzone, and an AMD platform security processor (PSP) in a hardware aspect. The TEE can function as a hardware black box. Code and data executed in the TEE cannot be peered even at the operating system layer, and can be operated only by using an interface predefined in the code. In terms of efficiency, due to the black box nature of the TEE, instead of a complex cryptographic operation in homomorphic encryption, a plaintext data operation is performed in the TEE, so that calculation process efficiency is almost not lost. Therefore, the program deployed in the TEE is used to obtain the user service data of the data owner from the trusted institution and process the obtained user service data, so that data privacy needs can be satisfied to a great extent under the premise of a relatively small performance loss. In addition, the program and data in the trusted execution environment cannot be tampered with, so that trustiness of the target data generated based on the program deployed in the TEE can be improved.

Certainly, when the target trusted application is deployed in the target server, the target trusted application can also be deployed in a trusted execution environment of the target server. The trusted execution environment is isolated from an operating system of the target server. The target trusted application can obtain the user service data of the data owner from the trusted institution by using an interface predefined in code in the trusted execution environment, to process the user service data to obtain the target data, thereby improving reliability of the target data generated based on the program deployed in the TEE.

When a data user needs to obtain the target data, because the target data has been stored in the trusted hardware, after the publishing the data description information in step 108, the method can further include the following:

an acquisition request generated by the data user for the target data based on the data description information is obtained, where the acquisition request can be generated by the data user based on the data description information published by the data owner for the target data and obtained from the data transmission application;

a usage authorization instruction of a usage authorization approver of the target data for the acquisition request is obtained;

the target data stored in the trusted hardware is digitally signed by using the private key of the data owner stored in the trusted hardware in response to the acquisition request, to obtain digitally signed data, where the public key corresponding to the private key is stored in the decentralized identifier document of the data owner; and the digitally signed data is sent to the data user.

The data user can obtain the public key corresponding to the private key stored in the trusted hardware from the DID Doc of the data owner, and perform signature verification on the digitally signed data by using the public key. If the verification succeeds, it can be determined that the digitally signed data is the target data authorized by the data owner for use. If the verification fails, it can be determined that the digitally signed data is not the target data authorized by the data owner for use, i.e., the obtained data is not trusted.

In the embodiments of the present specification, before publishing the data description information for the target data, the user can further specify a usage authorization approval process for the target data, to ensure security of the data asset of the data owner.

Therefore, before the publishing the data description information in step 108, the method can further include the following:

usage authorization approval process information specified by the data owner for the target data is obtained; and a mapping relationship between the usage authorization approval process information and the data description information is established.

Figure 2:
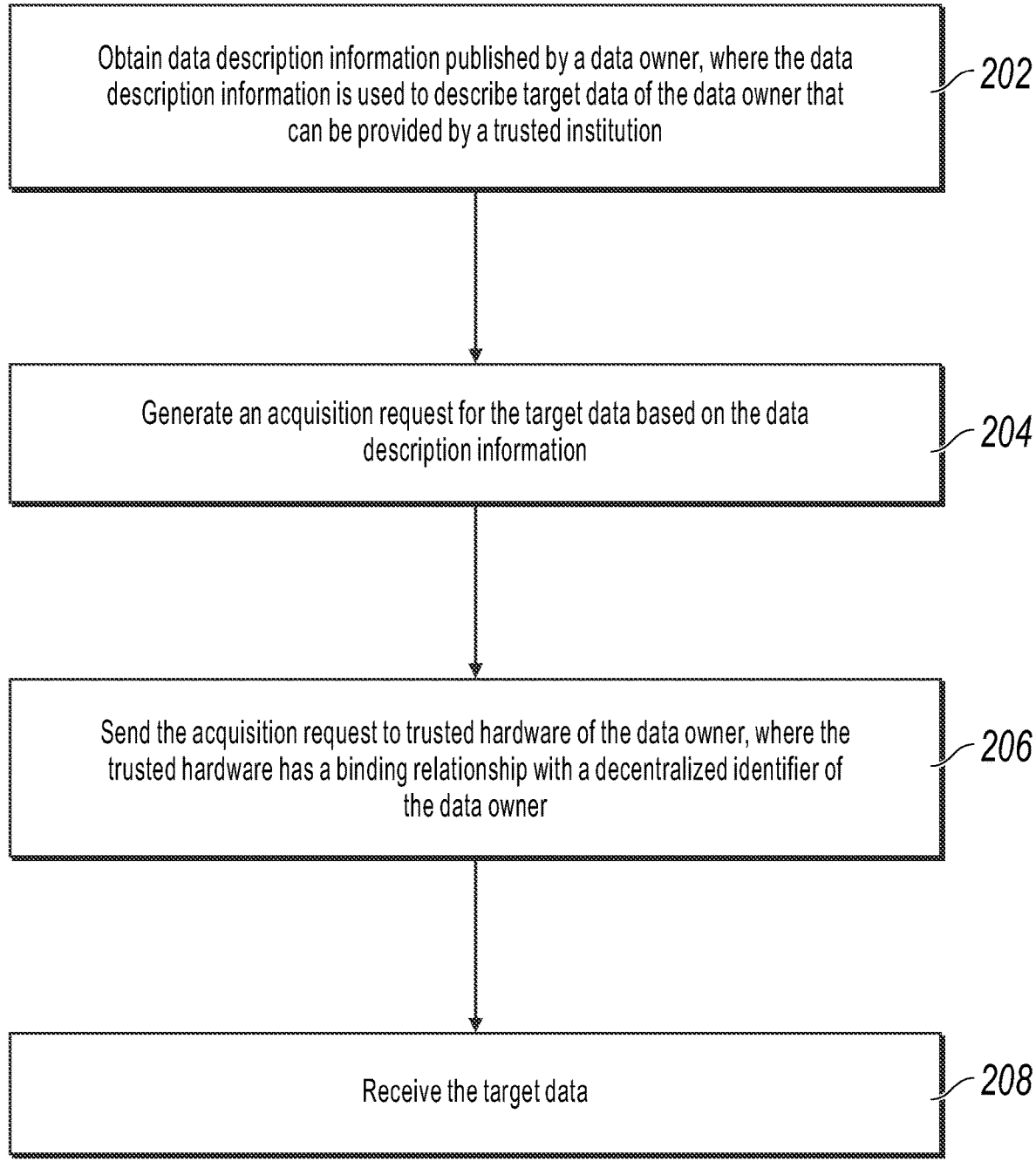
FIG. 2 is a schematic flowchart illustrating a data acquisition method, according to embodiments of the present specification.

Based on the same idea, FIG. 2 is a schematic flowchart illustrating a data acquisition method, according to embodiments of the present specification. From a program perspective, the process can be performed by a device of a data user, or an application included in the data user device and configured to manage a user data asset.

As shown in FIG. 2, the process can include the following steps.

Step 202: Obtain data description information published by a data owner, where the data description information is used to describe target data of the data owner that can be provided by a trusted institution.

In the embodiments of the present specification, because the data owner can publish the data description information to a data transmission application, in step 202, the data user can be enabled to obtain the data description information published by the data owner from the data transmission application. The data transmission application and the application configured to manage a user data asset can be the same application, or can be different applications. Implementations are not specifically limited.

Step 204: Generate an acquisition request for the target data based on the data description information.

Step 206: Send the acquisition request to trusted hardware of the data owner, where the trusted hardware has a binding relationship with a decentralized identifier of the data owner.

Step 208: Receive the target data.

It should be understood that, some steps of the method in the one or more embodiments of the present specification are interchangeable in terms of sequence based on actual needs, or some steps of the method can be omitted or deleted.

In the method in FIG. 2, the data user can request to obtain the target data from the trusted hardware of the data owner based on the data description information published by the data owner for the target data by using the trusted hardware, and receive the target data, so that the data user can conveniently obtain a data asset of the data owner, thereby improving convenience of data asset management and transfer.

Based on the method in FIG. 2, embodiments of the present specification further provide some specific implementations of the method. The specific implementations are described below.

In the embodiments of the present specification, the receiving the target data in step 208 can specifically include:

receiving the target data fed back by a target server, where the target data is obtained by processing user service data of the data owner that is stored in the trusted institution by using a target trusted application included in the target server; or receiving the target data fed back by the trusted hardware, where the target data is obtained by processing user service data of the data owner that is stored in the trusted institution by using a target trusted application included in the trusted hardware.

In the embodiments of the present specification, the target trusted application is included in a trusted execution environment of the target server if the target trusted application is included in the target server, and the trusted execution environment is isolated from an operating system of the target server. In addition, the program and data in the trusted execution environment cannot be tampered with, so that trustiness of the target data generated based on the program deployed in the TEE can be improved.

The target trusted application is included in a trusted execution environment of the trusted hardware if the target trusted application is included in the trusted hardware, and the trusted execution environment is isolated from an operating system of the trusted hardware. In addition, the program and data in the trusted execution environment cannot be tampered with, so that trustiness of the target data generated based on the program deployed in the TEE can be improved.

A private key of the data owner can be stored in the trusted hardware of the data owner, and a public key corresponding to the private key is stored in a decentralized identifier document of the data owner.

Therefore, the receiving the target data in step 208 can specifically include:

receiving the target data digitally signed by using the private key.

After the receiving the target data digitally signed by using the private key, the method can further include the following:

the public key is obtained from the decentralized identifier document of the data owner; and signature verification is performed on the digitally signed target data by using the public key.

Figure 3:
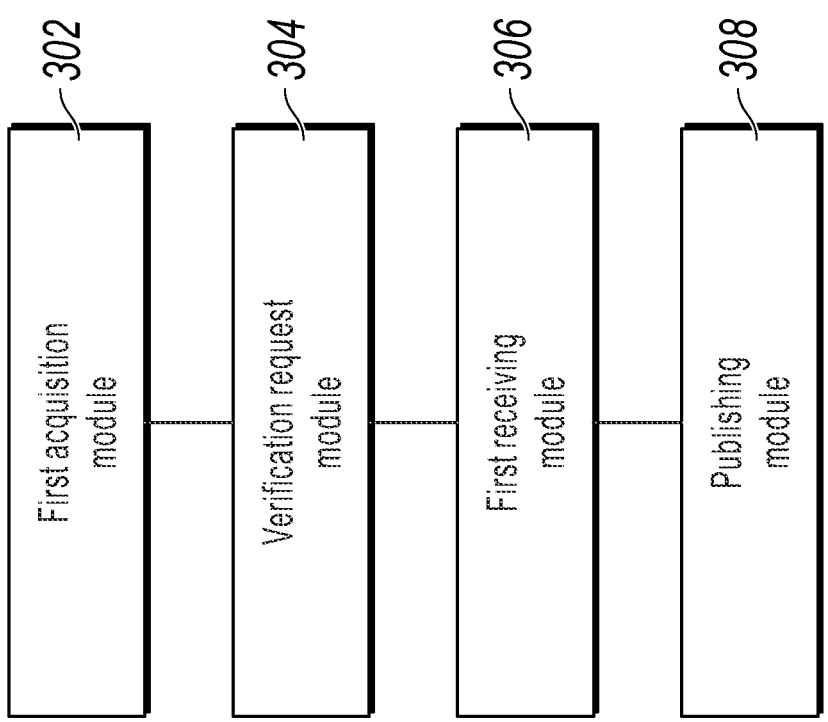
FIG. 3 is a schematic structural diagram illustrating a trusted hardware-based data management apparatus corresponding to FIG. 1, according to embodiments of the present specification.

Based on the same idea, embodiments of the present specification further provide an apparatus corresponding to the previously described method. FIG. 3 is a schematic structural diagram illustrating a trusted hardware-based data management apparatus corresponding to FIG. 1, according to embodiments of the present specification. As shown in FIG. 3, the apparatus can include:

a first acquisition module 302, configured to obtain, by a trusted hardware, data description information to be published, where the data description information is used to describe target data of a data owner that can be provided by a trusted institution, and the trusted hardware has a binding relationship with a decentralized identifier of the data owner;

a verification request module 304, configured to request the trusted institution to verify whether the trusted institution stores user service data needed for generating the target data;

a first receiving module 306, configured to receive a verification result fed back by the trusted institution; and a publishing module 308, configured to publish the data description information if the verification result indicates that the trusted institution stores the user service data needed for generating the target data.

Optionally, the apparatus in FIG. 3 can further include:

an identity identifier information acquisition module, configured to obtain identity identifier information of the data owner;

a hardware identifier information acquisition module, configured to obtain hardware identifier information of the trusted hardware;

a binding request module, configured to generate a decentralized identifier binding request based on the identity identifier information and the hardware identifier information, where the decentralized identifier binding request is used to request to establish a mapping relationship between the decentralized identifier of the data owner and the trusted hardware; and a binding request sending module, configured to send the decentralized identifier binding request to a decentralized identity server.

Optionally, the first acquisition module 302 can be specifically configured to:

identify, by the trusted hardware, a selection operation performed by the data owner on a program identifier of a target trusted application displayed in a target application interface, where the selection operation is used to indicate to process the user service data of the data owner in the trusted institution by using the target trusted application to obtain the target data, and the target trusted application is deployed in a trusted application environment of a target server; and generate the data description information to be published for the target data based on the selection operation.

Optionally, the apparatus in FIG. 3 can further include:

a mapping relationship information storage module, configured to store information about a mapping relationship between the target trusted application and the target data in a decentralized identifier document of the data owner.

Optionally, the apparatus in FIG. 3 can further include:

a second acquisition module, configured to obtain an acquisition request generated by a data user for the target data based on the data description information;

a sending module, configured to send a request for generating the target data to the target server carrying the target trusted application in response to the acquisition request; and a second receiving module, configured to receive a processing result fed back by the target server.

Optionally, the trusted hardware stores a private key of the data owner, and a public key corresponding to the private key is stored in a decentralized identifier document of the data owner; and the apparatus in FIG. 3 can further include:

a third acquisition module, configured to obtain a usage authorization instruction of a usage authorization approver of the target data for the acquisition request;

a usage authorization information generation module, configured to generate usage authorization information based on the usage authorization instruction; and a first digital signature module, configured to digitally sign the usage authorization information by using the private key, to obtain digitally signed usage authorization information; and the sending module can be specifically configured to:

send the digitally signed usage authorization information to the target server carrying the target trusted application.

Optionally, the first acquisition module 302 can be specifically configured to:

obtain, by the trusted hardware, the user service data of the data owner from the trusted institution;

process the user service data by using a target trusted application included in the trusted hardware, to obtain the target data; and generate the data description information to be published for the target data.

Optionally, the target trusted application is included in a trusted execution environment of the trusted hardware, and the trusted execution environment is isolated from an operating system of the trusted hardware.

Correspondingly, that the trusted hardware obtains the user service data of the data owner from the trusted institution specifically includes:

the trusted hardware obtains the user service data of the data owner from the trusted institution by using an interface predefined in code in the trusted execution environment.

Optionally, the trusted hardware stores a private key of the data owner, and a public key corresponding to the private key is stored in a decentralized identifier document of the data owner; and the apparatus in FIG. 3 can further include:

a fourth acquisition module, configured to obtain an acquisition request generated by a data user for the target data based on the data description information;

a second digital signature module, configured to digitally sign the target data stored in the trusted hardware by using the private key in response to the acquisition request, to obtain digitally signed data;

a usage authorization instruction acquisition module, configured to obtain a usage authorization instruction of a usage authorization approver of the target data for the acquisition request; and a target data sending module, configured to send the digitally signed data to the data user if the usage authorization instruction is obtained.

Optionally, the apparatus in FIG. 3 can further include:

an approval process information acquisition module, configured to obtain usage authorization approval process information specified by the data owner for the target data; and a mapping relationship establishment module, configured to establish a mapping relationship between the usage authorization approval process information and the data description information.

Optionally, the publishing module 308 can be specifically configured to publish the data description information to a data transmission application; and the second acquisition module or the fourth acquisition module can be specifically configured to obtain the acquisition request of the data user for the target data, where the acquisition request is generated based on the data description information obtained from the data transmission application.

Figure 4:
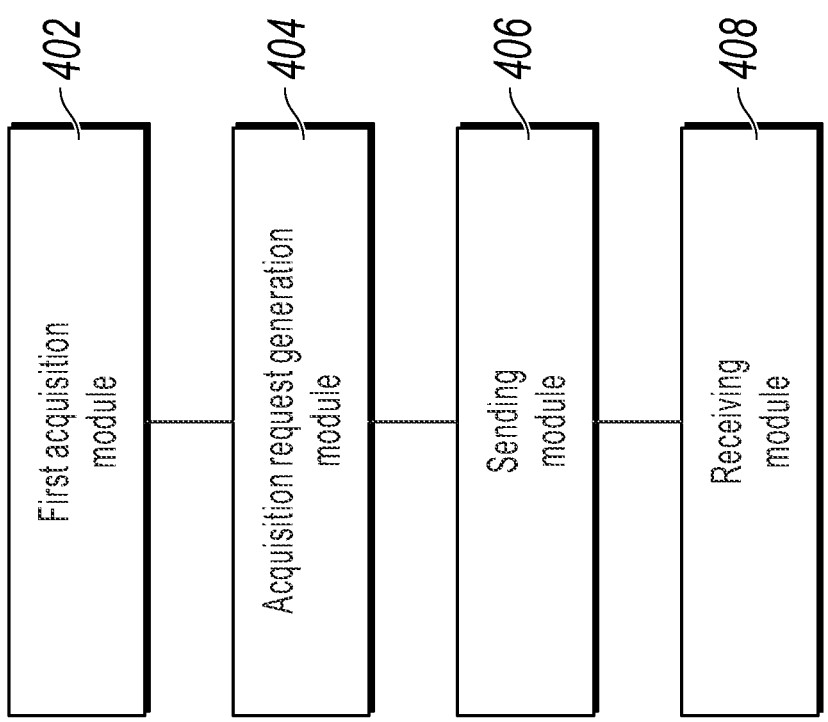
FIG. 4 is a schematic structural diagram illustrating a data acquisition apparatus corresponding to FIG. 2, according to embodiments of the present specification.

Based on the same idea, embodiments of the present specification further provide an apparatus corresponding to the previously described method. FIG. 4 is a schematic structural diagram illustrating a data acquisition apparatus corresponding to FIG. 2, according to embodiments of the present specification. As shown in FIG. 4, the apparatus can include:

a first acquisition module 402, configured to obtain data description information published by a data owner, where the data description information is used to describe target data of the data owner that can be provided by a trusted institution;

an acquisition request generation module 404, configured to generate an acquisition request for the target data based on the data description information;

a sending module 406, configured to send the acquisition request to trusted hardware of the data owner, where the trusted hardware has a binding relationship with a decentralized identifier of the data owner; and a receiving module 408, configured to receive the target data.

Optionally, in the apparatus in FIG. 4, the receiving module 408 can be specifically configured to:

receive the target data fed back by a target server, where the target data is obtained by processing user service data of the data owner that is stored in the trusted institution by using a target trusted application included in the target server; or receive the target data fed back by the trusted hardware, where the target data is obtained by processing user service data of the data owner that is stored in the trusted institution by using a target trusted application included in the trusted hardware.

Optionally, the target trusted application is included in a trusted execution environment of the target server if the target trusted application is included in the target server, and the trusted execution environment is isolated from an operating system of the target server; and the target trusted application is included in a trusted execution environment of the trusted hardware if the target trusted application is included in the trusted hardware, and the trusted execution environment is isolated from an operating system of the trusted hardware.

Optionally, the trusted hardware stores a private key of the data owner, and a public key corresponding to the private key is stored in a decentralized identifier document of the data owner; and the receiving module 408 can be specifically configured to receive the target data digitally signed by using the private key.

Optionally, the apparatus in FIG. 4 can further include:

a second acquisition module, configured to obtain the public key from the decentralized identifier document of the data owner; and a signature verification module, configured to perform signature verification on the digitally signed target data by using the public key.

Based on the same idea, embodiments of the present specification further provide a device corresponding to the previously described method.

Figure 5:
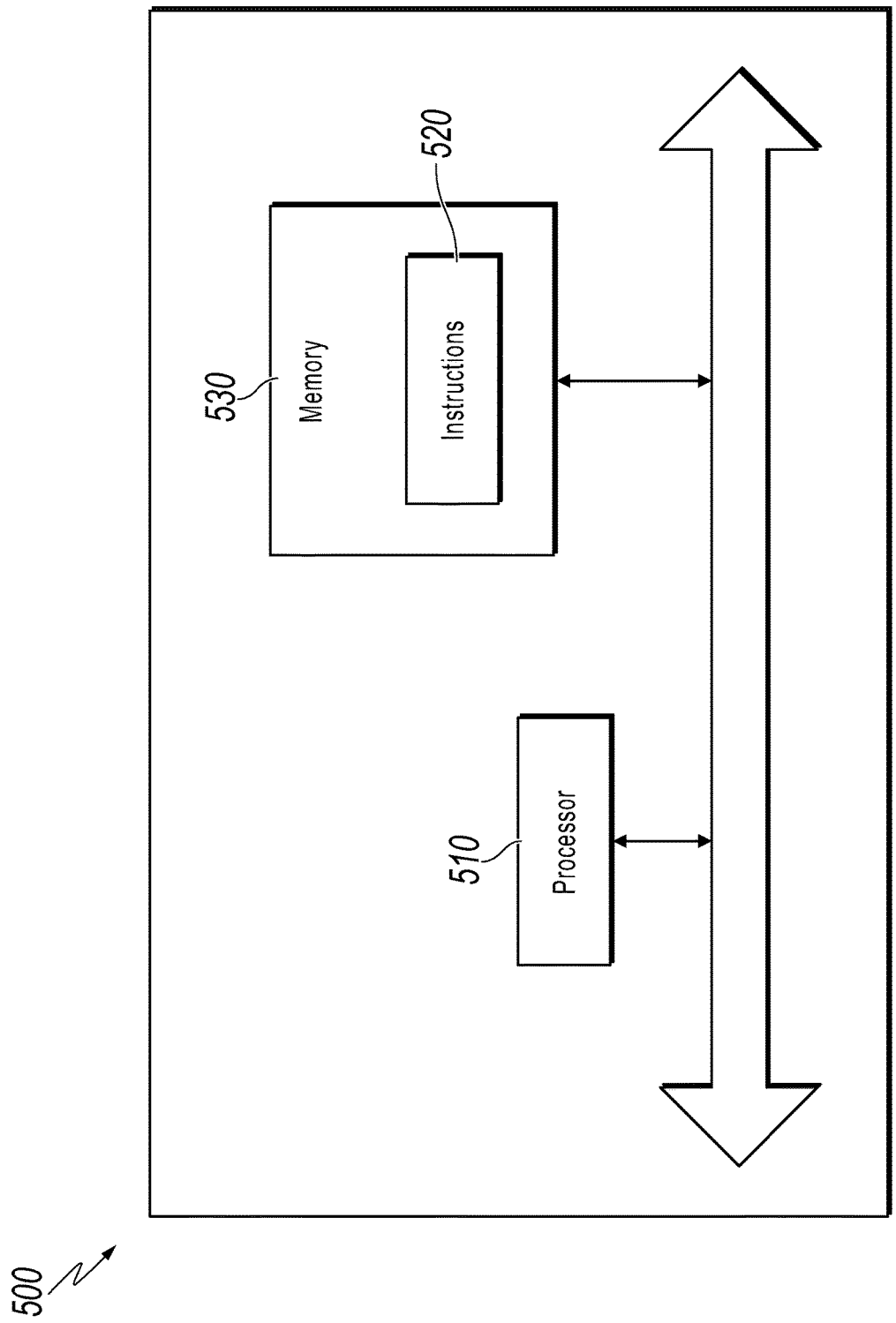
FIG. 5 is a schematic structural diagram illustrating a trusted hardware-based data management device corresponding to FIG. 1, according to embodiments of the present specification.

FIG. 5 is a schematic structural diagram illustrating a trusted hardware-based data management device corresponding to FIG. 1, according to embodiments of the present specification. As shown in FIG. 5, a device 500 can include:

at least one processor 510; and a memory 530 communicably coupled to the at least one processor.

The memory 530 stores instructions 520 that can be executed by the at least one processor 510, and the instructions are executed by the at least one processor 510 to enable the at least one processor 510 to:

obtain data description information to be published, where the data description information is used to describe target data of a data owner that can be provided by a trusted institution, and the trusted hardware has a binding relationship with a decentralized identifier of the data owner;

request the trusted institution to verify whether the trusted institution stores user service data needed for generating the target data;

receive a verification result fed back by the trusted institution; and publish the data description information if the verification result indicates that the trusted institution stores the user service data needed for generating the target data.

Based on the same idea, embodiments of the present specification further provide a device corresponding to the previously described method.

Figure 6:
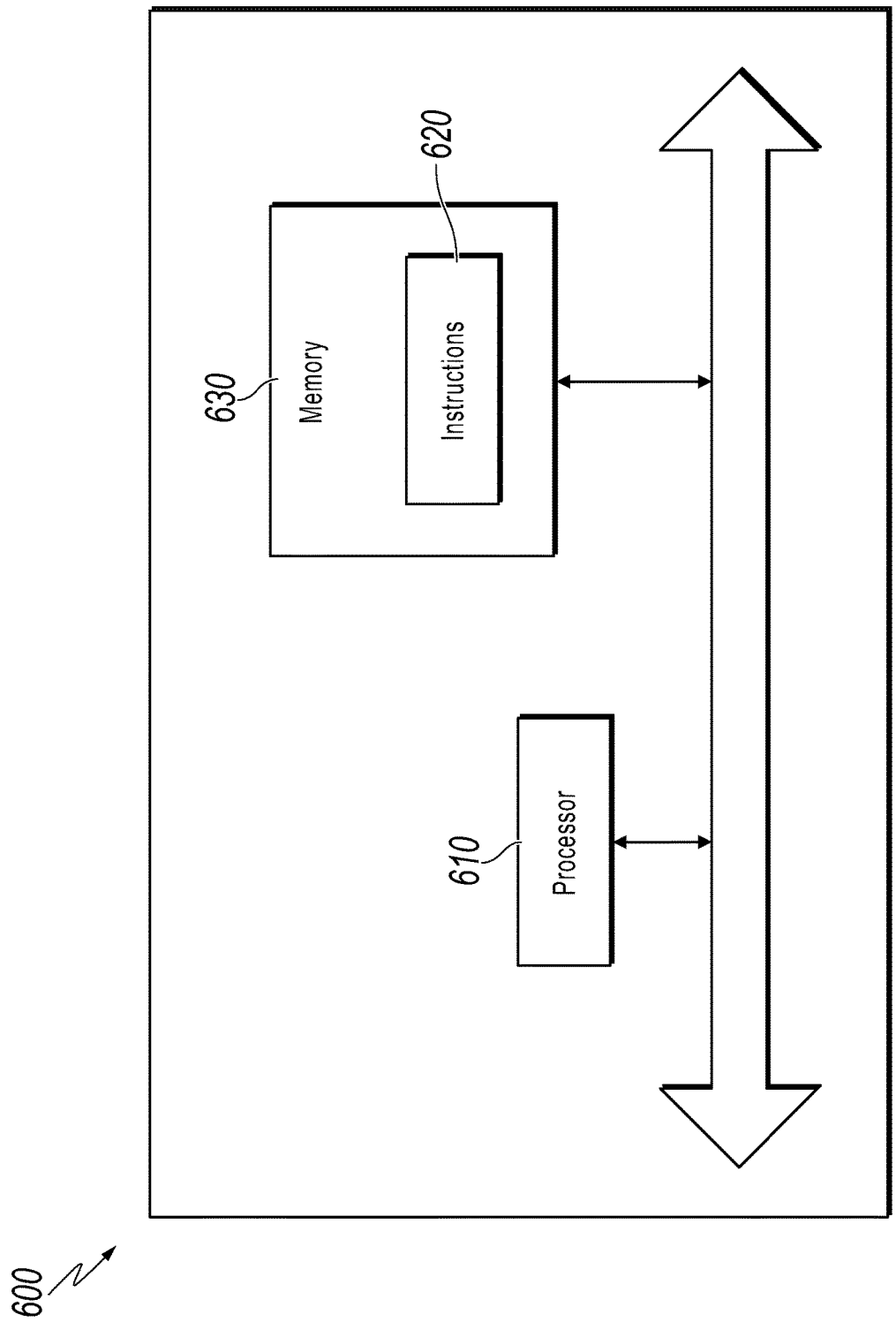
FIG. 6 is a schematic structural diagram illustrating a data acquisition device corresponding to FIG. 2, according to embodiments of the present specification.

FIG. 6 is a schematic structural diagram illustrating a data acquisition device corresponding to FIG. 2, according to embodiments of the present specification. As shown in FIG. 6, a device 600 can include:

at least one processor 610; and a memory 630 communicably coupled to the at least one processor.

The memory 630 stores instructions 620 that can be executed by the at least one processor 610, and the instructions are executed by the at least one processor 610 to enable the at least one processor 610 to:

obtain data description information published by a data owner, where the data description information is used to describe target data of the data owner that can be provided by a trusted institution;

generate an acquisition request for the target data based on the data description information;

send the acquisition request to trusted hardware of the data owner, where the trusted hardware has a binding relationship with a decentralized identifier of the data owner; and receive the target data.

The embodiments of the present specification are described in a progressive way. For same or similar parts of the embodiments, mutual references can be made to the embodiments. Each embodiment focuses on a difference from other embodiments. Especially, the devices shown in FIG. 5 and FIG. 6 are basically similar to method embodiments, and therefore are described briefly. For related parts, reference can be made to some descriptions in the method embodiments.

In the 1990s, whether a technical improvement is a hardware improvement (for example, an improvement of circuit structures, such as a diode, a transistor, or a switch) or a software improvement (an improvement of a method procedure) can be clearly distinguished. However, as technologies develop, current improvements of many method procedures can be considered as direct improvements to hardware circuit structures. Almost all designers program an improved method process into a hardware circuit, to obtain a corresponding hardware circuit structure. Therefore, a method process can be implemented by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system to a single PLD, without needing a chip manufacturer to design and manufacture a dedicated integrated circuit chip. In addition, at present, instead of manually manufacturing an integrated circuit chip, this type of programming is mostly implemented by using "logic compiler" software. The "logic compiler" software is similar to a software compiler used to develop and write a program. Original code needs to be written in a particular programming language before compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used at present. A person skilled in the art should also understand that a hardware circuit that implements a logical method procedure can be readily obtained provided that the method procedure is logically programmed by using several of the previously described HDLs and is programmed into an integrated circuit.

A controller can be implemented by using any appropriate method. For example, the controller can be in a form a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of the memory. A person skilled in the art should also know that, in addition to implementing the controller by using only the computer readable program code, method steps can be logically programmed to allow the controller to implement the same function in a form of the logic gate, the switch, the ASIC, the programmable logic controller, or the built-in microcontroller. Therefore, the controller can be considered as a hardware component, and an apparatus included in the controller to implement various functions can also be considered as a structure in the hardware component. Alternatively, the apparatus for implementing various functions can even be considered as both a software module for implementing the method and a structure in the hardware component.

The system, apparatus, module, or unit illustrated in the previously described embodiments can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or any device combination of these devices.

For ease of description, when the apparatus is described, the apparatus is divided into various units based on functions for separate description. Certainly, when the present application is implemented, functions of the units can be implemented in one or more pieces of software and/or hardware.

A person skilled in the art should understand that the embodiments of the present invention each can be provided as a method, a system, or a computer program product. Therefore, the present invention can use a form of hardware only embodiments, software only embodiments, or embodiments with a combination of software and hardware. Moreover, the present invention can use a form of a computer program product implemented on one or more computer-usable storage media (including but not limited to a magnetic disk memory, a CD-ROM, an optical memory, etc.) that include computer-usable program code.

The present invention is described with reference to the flowcharts and/or block diagrams of the method, the device (system), and the computer program product according to the embodiments of the present invention. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

Alternatively, these computer program instructions can be stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

Alternatively, these computer program instructions can be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more processors (CPUs), input/output interfaces, network interfaces, and memories.

The memory may include a non-persistent memory, a random access memory (RAM), a nonvolatile memory, and/or another form in a computer readable medium, for example, a read-only memory (ROM) or a flash memory (flash RAM). The memory is an example of the computer readable medium.

The computer-readable medium includes persistent, non-persistent, movable, and unmovable media that can store information by using any method or technology. The information can be a computer readable instruction, a data structure, a program module, or other data. Examples of a computer storage medium include but are not limited to: a phase change memory (PRAM), a static random access memory (SRAM), a dynamic random access memory (DRAM) or another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic tape/magnetic disk memory or another magnetic storage device, or any other non-transmission medium that can be used to store information that can be accessed by a computing device. Based on the definition in the present specification, the computer readable medium does not include computer readable transitory media such as a modulated data signal and carrier.

It is worthwhile to further note that, the terms "include", "comprise", or their any other variants are intended to cover a non-exclusive inclusion, so that a process, a method, a product, or a device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the embodiments of the present application each can be provided as a method, a system, or a computer program product. Therefore, the present application can use a form of hardware only embodiments, software only embodiments, or embodiments with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. for executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The previous descriptions are merely embodiments of the present application, and are not intended to limit the present application. A person skilled in the art can make various modifications and changes to the present application. Any modification, equivalent replacement, improvement, etc. made without departing from the spirit and principle of the present application shall fall within the scope of the claims of the present application.

What is claimed is:

1. A computer-implemented method, comprising:
sending, by trusted hardware to a decentralized identity server, a binding request based on identity information of a data owner and unique hardware identification information of the trusted hardware, wherein the binding request requests to establish a mapping relationship between a decentralized identifier of the data owner and the trusted hardware;
identifying, by the trusted hardware, data description information to be published, wherein the data description information describes target data of the data owner, the target data is provided by a trusted institution and generated based on user service data, and the trusted hardware is associated with the decentralized identifier of the data owner;
requesting the trusted institution to verify whether the trusted institution stores the user service data for generating the target data;
receiving a verification result from the trusted institution; and
publishing the data description information in response to determining that the verification result indicates that the trusted institution stores the user service data for generating the target data.

2. The computer-implemented method of claim 1, wherein requesting the trusted institution to verify whether the trusted institution stores the user service data for generating the target data comprises requesting the trusted institution to verify whether the data description information is digitally signed by using a private key corresponding to a public key included in a decentralized identifier document of the data owner.

3. The computer-implemented method of claim 1, wherein identifying, by the trusted hardware, the data description information to be published comprises:

identifying, by the trusted hardware, a selection operation performed by the data owner on a program identifier of a trusted application displayed in an application interface, wherein the selection operation indicates to process the user service data of the data owner by using the trusted application to obtain the target data, and the trusted application is comprised in a trusted application environment of a target server; and generating the data description information to be published for the target data based on the selection operation.

4. The computer-implemented method of claim 3, comprising:

storing a second mapping relationship between the trusted application and the target data in a decentralized identifier document of the data owner, wherein the second mapping relationship determines the trusted application based on the target data.

5. The computer-implemented method of claim 3, comprising:

receiving an acquisition request generated by a data user for the target data based on the data description information;

in response to the acquisition request, sending a generation request for the target data to the target server, wherein the target server comprises the trusted application; and receiving a processing result from the target server.

6. The computer-implemented method of claim 5, wherein the trusted hardware stores a private key of the data owner, wherein a public key corresponding to the private key is stored in a decentralized identifier document of the data owner, and comprising:

in response to the acquisition request, identifying a data use authorization instruction from a data approver of the target data;

generating data use authorization information based on the data use authorization instruction; and digitally signing, as digitally signed data use authorization information, the data use authorization information by using the private key to obtain digitally data use authorization information; and sending the digitally signed data use authorization information to the target server.

7. The computer-implemented method of claim 1, wherein identifying the data description information comprises:

identifying, by the trusted hardware, the user service data of the data owner from the trusted institution;

processing the user service data by using a trusted application comprised in the trusted hardware to obtain the target data; and generating the data description information for the target data.

8. The computer-implemented method of claim 7, wherein the trusted hardware stores a private key of the data owner, wherein a public key corresponding to the private key is stored in a decentralized identifier document of the data owner, and comprising:

receiving an acquisition request generated by a data user for the target data based on the data description information;

in response to the acquisition request, digitally signing using the private key and to obtain digitally signed data, the target data stored in the trusted hardware; and sending the digitally signed data to the data user.

9. The computer-implemented method of claim 8, comprising:

in response to the acquisition request, identifying a data use authorization instruction of a data approver of the target data.

10. The computer-implemented method of claim 9, comprising:

identifying data use approval process information provided by the data owner for the target data; and establishing a mapping relationship between the data use approval process information and the data description information.

11. The computer-implemented method of claim 7, wherein the trusted application is comprised in a trusted execution environment of the trusted hardware, and the trusted execution environment is isolated from an operating system of the trusted hardware.

12. A non-transitory, computer-readable medium storing one or more instructions executable by a computer system to perform operations comprising:

sending, by trusted hardware to a decentralized identity server, a binding request based on identity information of a data owner and unique hardware identification information of the trusted hardware, wherein the binding request requests to establish a mapping relationship between a decentralized identifier of the data owner and the trusted hardware;

identifying, by the trusted hardware, data description information to be published, wherein the data description information describes target data of the data owner, the target data is provided by a trusted institution and generated based on user service data, and the trusted hardware is associated with the decentralized identifier of the data owner;

requesting the trusted institution to verify whether the trusted institution stores the user service data for generating the target data;

receiving a verification result from the trusted institution; and publishing the data description information in response to determining that the verification result indicates that the trusted institution stores the user service data for generating the target data.

13. The non-transitory, computer-readable medium of claim 12, wherein requesting the trusted institution to verify whether the trusted institution stores the user service data for generating the target data comprises requesting the trusted institution to verify whether the data description information is digitally signed by using a private key corresponding to a public key included in a decentralized identifier document of the data owner.

14. The non-transitory, computer-readable medium of claim 12, wherein identifying, by the trusted hardware, the data description information to be published comprises:

identifying, by the trusted hardware, a selection operation performed by the data owner on a program identifier of a trusted application displayed in an application interface, wherein the selection operation indicates to process the user service data of the data owner by using the trusted application to obtain the target data, and the trusted application is comprised in a trusted application environment of a target server; and generating the data description information to be published for the target data based on the selection operation.

15. The non-transitory, computer-readable medium of claim 14, comprising:
storing a second mapping relationship between the trusted application and the target data in a decentralized identifier document of the data owner, wherein the second mapping relationship determines the trusted application based on the target data.

16. The non-transitory, computer-readable medium of claim 14, comprising:
receiving an acquisition request generated by a data user for the target data based on the data description information;
in response to the acquisition request, sending a generation request for the target data to the target server, wherein the target server comprises the trusted application; and
receiving a processing result from the target server.

17. The non-transitory, computer-readable medium of claim 16, wherein the trusted hardware stores a private key of the data owner, wherein a public key corresponding to the private key is stored in a decentralized identifier document of the data owner, and comprising:
in response to the acquisition request, identifying a data use authorization instruction from a data approver of the target data;
generating data use authorization information based on the data use authorization instruction; and
digitally signing, as digitally signed data use authorization information, the data use authorization information by using the private key to obtain digitally data use authorization information; and
sending the digitally signed data use authorization information to the target server.

18. The non-transitory, computer-readable medium of claim 12, wherein identifying the data description information comprises:
identifying, by the trusted hardware, the user service data of the data owner from the trusted institution;
processing the user service data by using a trusted application comprised in the trusted hardware to obtain the target data; and
generating the data description information for the target data.

19. The non-transitory, computer-readable medium of claim 18, wherein the trusted hardware stores a private key of the data owner, wherein a public key corresponding to the private key is stored in a decentralized identifier document of the data owner, and comprising:
receiving an acquisition request generated by a data user for the target data based on the data description information;
in response to the acquisition request, digitally signing using the private key and to obtain digitally signed data, the target data stored in the trusted hardware; and
sending the digitally signed data to the data user.

20. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
sending, by trusted hardware to a decentralized identity server, a binding request based on identity information of a data owner and unique hardware identification information of the trusted hardware, wherein the binding request requests to establish a mapping relationship between a decentralized identifier of the data owner and the trusted hardware;
identifying, by the trusted hardware, data description information to be published, wherein the data description information describes target data of the data owner, the target data is provided by a trusted institution and generated based on user service data, and the trusted hardware is associated with the decentralized identifier of the data owner;
requesting the trusted institution to verify whether the trusted institution stores the user service data for generating the target data;
receiving a verification result from the trusted institution; and
publishing the data description information in response to determining that the verification result indicates that the trusted institution stores the user service data for generating the target data.

* * * * *